United States Patent [19]

Hancock

[11] Patent Number: 5,184,503
[45] Date of Patent: Feb. 9, 1993

[54] DEVICE FOR MEASURING CHANGE IN PROFILE HEIGHT OF ARTICLES

[75] Inventor: Stephen H. Hancock, Tequesta, Fla.

[73] Assignee: Northern Telecom Limited, Montreal, Canada

[21] Appl. No.: 703,758

[22] Filed: May 21, 1991

[51] Int. Cl.⁵ .................................................. G01B 5/20
[52] U.S. Cl. ........................................ 73/37.5; 73/105
[58] Field of Search .................. 73/37.5, 37.6, 37.7, 73/37.8, 37.9, 105; 324/662

[56] References Cited

U.S. PATENT DOCUMENTS

| | | | |
|---|---|---|---|
| 4,179,919 | 12/1979 | McKechnie | 73/37.5 |
| 4,206,633 | 6/1980 | McKechnie et al. | 73/37.5 X |
| 4,397,078 | 8/1983 | Imahashi | 324/662 X |
| 4,560,924 | 12/1985 | Norberg | 324/662 |

FOREIGN PATENT DOCUMENTS 1552000  3/1990  U.S.S.R. ........................ 73/37.9

OTHER PUBLICATIONS

Hoekstra, J. *Noncontacting Surface Height Gage.* In IBM Tech. Discl. Bulletin, vol. 14 No. 2 pp. 585-586, Jul. 1971.

*Primary Examiner*—Hezron E. Williams
*Assistant Examiner*—Joseph W. Roskos
*Attorney, Agent, or Firm*—Foley & Lardner

[57] ABSTRACT

A height profile measuring device operated by air flow through a nozzle and directed at the surface of the profile which is to be measured. The device has a support which allows the device to move in one plane while measurement takes place and an indicator operating upon a change in characteristic of the air flow, dependent upon nozzle distance from the surface, is provided to provide information relating to profile change. The device is useful for measuring the height of conductor elements on a printed circuit board.

4 Claims, 3 Drawing Sheets

DEVICE FOR MEASURING CHANGE IN PROFILE HEIGHT OF ARTICLES

BACKGROUND OF THE INVENTION

This invention relates to a device for measuring change in the profile height of a surface of an article.

FIELD OF THE INVENTION

In the manufacture of certain articles, it is paramount that change in the profile height of a surface may be substantially accurately measured. One example of such an article is a printed circuit board, particularly a controlled impedance printed circuit board, in which the height of certain conductor elements above their respective circuit board panels needs to be measured to determine whether the height lies within precise limits.

Specifically designed mechanical devices are known for measuring the height of such conductor elements. These devices rely for measurement purposes upon the difference between the relative positions of a plunger when supported by the circuit board panel and then by the outer surface of a conductor element. These devices need to be read manually which is subject to user error. In addition, such devices are accurate only to within 0.0002 inches.

SUMMARY OF THE INVENTION

The present invention seeks to provide a height measuring device which is more accurate and more reliable than known measuring devices.

Accordingly, the present invention provides a device for determining change in profile height of a surface of an article, the device comprising a body, a support means extending from one side of the body for the body and which allows for movement over the article while the support means remains stationary upon the article and gas flow nozzle means within the body and providing a gas outlet orifice disposed to deliver a flow of gas outwardly from the one side of the body and beyond the support means to direct the gas at said surface, the nozzle means being for connection to a gas flow source and to means for sensing and indicating a change in a characteristic of the gas flow through the outlet orifice, the characteristic being dependent upon the distance of the outlet orifice from the surface.

The device may include an inlet tube means for connection to the gas flow source and the sensing and indicating means may be included as a gauge by being connected to the inlet tube means. Preferably, however, the gauge may be incorporated directly onto the nozzle means and interconnected with the gas outlet orifice so as to be able to register directly any change in the characteristic of the gas flowing through the outlet orifice as the body moves over the article. The gauge may be of pressure or gas flow measurement type and the measurements may be translated into distance measurements which represent the distance of the outlet orifice from the surface at which the gas flow is to be directed.

In use, resistance to gas flow from the orifice is created by any surface against which the gas is directed with the support means of the device engaging the surface of the article. Any change of distance between the surface and the outlet orifice is accompanied by a change in resistance to flow which is measurable upon the gauge. Thus, with the device supported upon the surface and the body movable over the surface, the height of any projections or the depth of any grooves or recesses may be measured when the outlet orifice is passed over such projections or grooves and outwardly beyond at least one side of the projections or grooves. In the specific field of printed circuit board technology, the device may be supported directly upon a surface of a printed circuit board panel, i.e. by being supported upon outer surfaces of conductor elements and the gauge provides a reading corresponding to the distance of any part of the total surface from the outlet orifice. As the body of the device is moved laterally across the conductor elements, i.e. copper pathways carried by the board panels, gas flow directed from the outlet orifice is impeded by the outer surface of each conductor element in turn and the change in resistance to gas flow results in a different reading being obtained upon the gauge. In addition, as the outlet orifice passes from one conductor element to another and directs gas against the surface of the panel then different readings are obtained for the gas flow characteristic and the differences between the readings indicate the height of the conductor elements from the panel.

The invention also includes a method of determining a change in profile height of a surface comprising moving a body carrying a gas flow nozzle across the surface with a support means for the body remaining stationary upon the surface and while directing a flow of gas from an outlet orifice of the nozzle against the surface so that any change in distance of the outlet orifice from the surface effectively causes a corresponding change in a characteristic of the gas flowing through the outlet orifice, and sensing and indicating said change.

In the above method, the characteristic of the change is preferably indicated directly upon a gauge as a distance measurement.

More particularly the invention includes a method of determining a change in profile height of the surface formed by an elongate conductor element and a printed circuit board panel carrying the elongate conductor element comprising:- moving a body carrying a gas flow nozzle across said surface with a support means for the body remaining stationary upon the surface and while directing a flow of the gas from an outlet orifice of the nozzle in sequence at a conductor element and then at the panel surface so that any change in distance of the orifice from the surface effectively causes a corresponding change in a characteristic of the gas flowing through the orifice, and sensing and indicating said change.

In the method for determining the height of the elongate conductor element above the surface of the printed circuit board panel, it is preferable that a vacuum is applied to the opposite surface of the panel so as to hold the panel in planar condition while the body is moved and the change in the characteristic is sensed and indicated.

BRIEF DESCRIPTION OF THE DRAWINGS

One embodiment of the invention will now be described by way of example with reference to the accompanying drawings, in which.

DETAILED DESCRIPTION OF THE PREFERRED EMBODIMENTS

Figure 1:
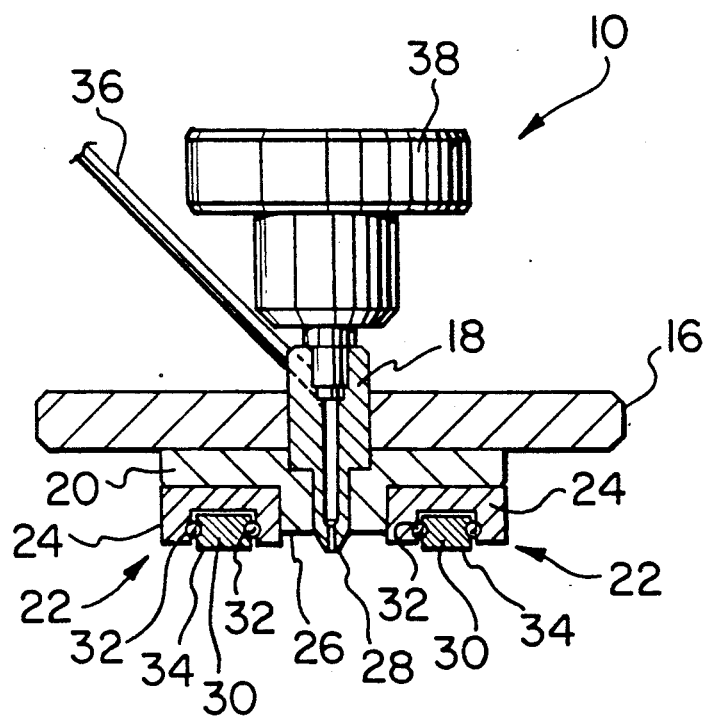
FIG. 1 is a cross-sectional view, in side elevation, through a device for determining the height of elongate conductor elements upon a surface of a printed circuit board panel.
Figure 2:
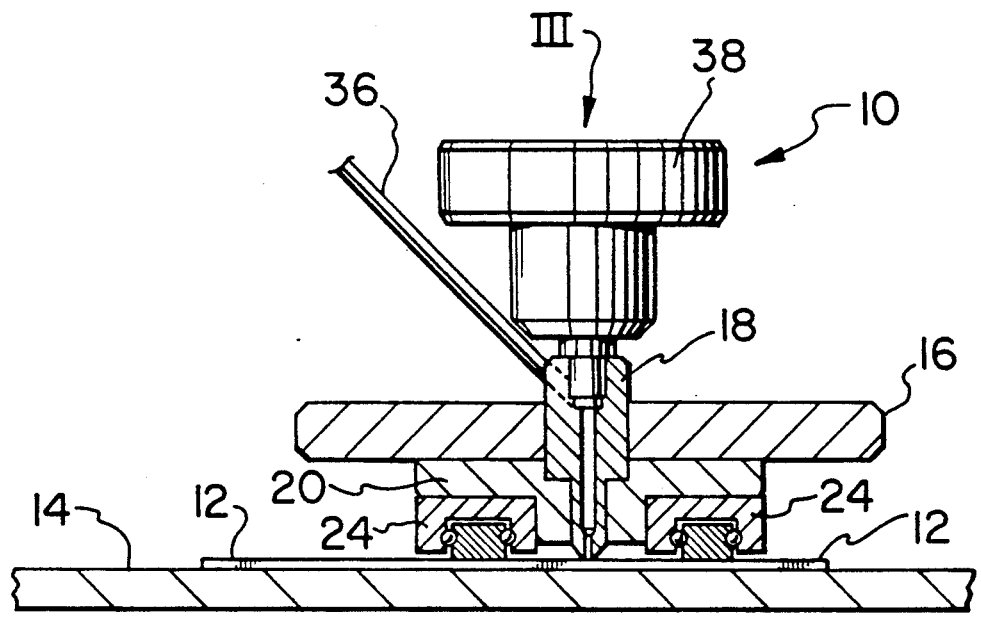
FIG. 2 is a view similar to FIG. 1 of the device mounted upon a printed circuit board panel.
Figure 3:
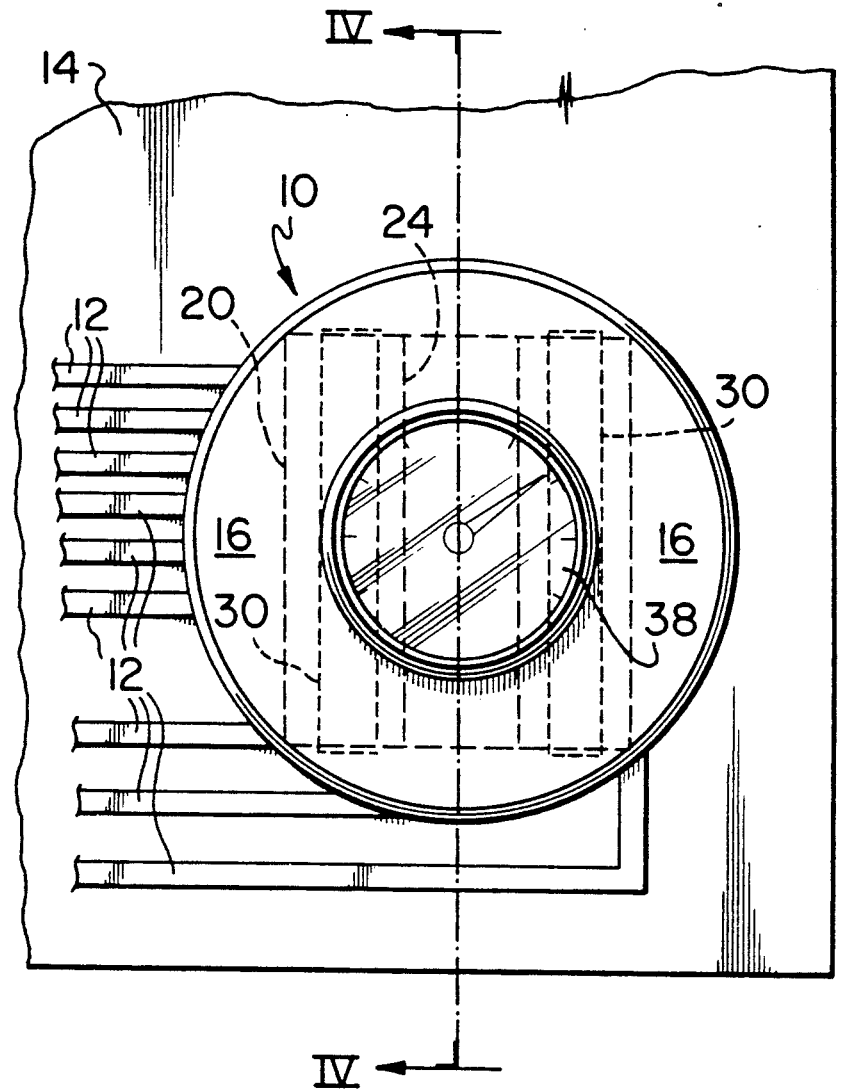
FIG. 3 is a plan view in the direction of arrow III in FIG. 2.

As shown in FIGS. 1, 2 and 3, a device 10 for measuring the height of conductor elements, i.e. conductor pathways 12, provided upon a circuit board panel 14 comprises an annular body 16 coaxially carrying an air flow nozzle 18 which extends from one side of the body to the other and is partly carried by a mounting 20 located beneath the body 16. The body 16 extends outwardly in all directions so that it may be used as a handle for applying downward pressure upon the device and upon the printed circuit board panel and also for controlling movement of the body 16 of the device across the panel.

The body 16 is provided upon one side with a support means which comprises slides 30 forming parts of two roller slide assemblies 22. Each assembly 22 further comprises an inverted U-shaped slide channel 24 which is secured beneath the mounting 20 by the base of the 'U' with the channel opening downwardly. The two channels lie parallel and are disposed one on each side of a central boss 26 of the mounting 20 with the lower end of the nozzle 18 extending through the boss to an outlet orifice 28 of the nozzle, the diameter of the orifice being 0.020 inches. In each assembly 22, the slide 30 is slidably mounted within its channel 24 with two rows of bearings 32 interposed between the channel 24 and the slide 30, one row on each side of the slide. Alternatively, the channel and slide are, for instance, of complementary dovetail shape to allow for the sliding action.

The orifice 28 which is located at one end of the nozzle is positioned slightly inwardly of lower planar and coplanar surfaces 34 of the slides 30 as shown by FIG. 1 and is oriented to direct a flow of air outwardly from between the slides. The nozzle is connected by an air supply hose 36 (FIGS. 1 and 2) to a supply of air under pressure and means is provided for sensing and indicating a change in a characteristic of air flow through the outlet orifice, this change in characteristic being dependent upon the distance of the outlet orifice from any surface against which the air is directed. This sensing and indicating means is provided by a pressure gauge 38 having a clock indicator (FIG. 3) and extending upwardly from the body 16. Alternatively, the indicator is an electronic readout (not shown) such as is provided by an LED which would operate within 0.00002 inch of accuracy. Conveniently, the indicator converts the pressure of the air travelling through the nozzle directly into distance measurements.

Figure 4:
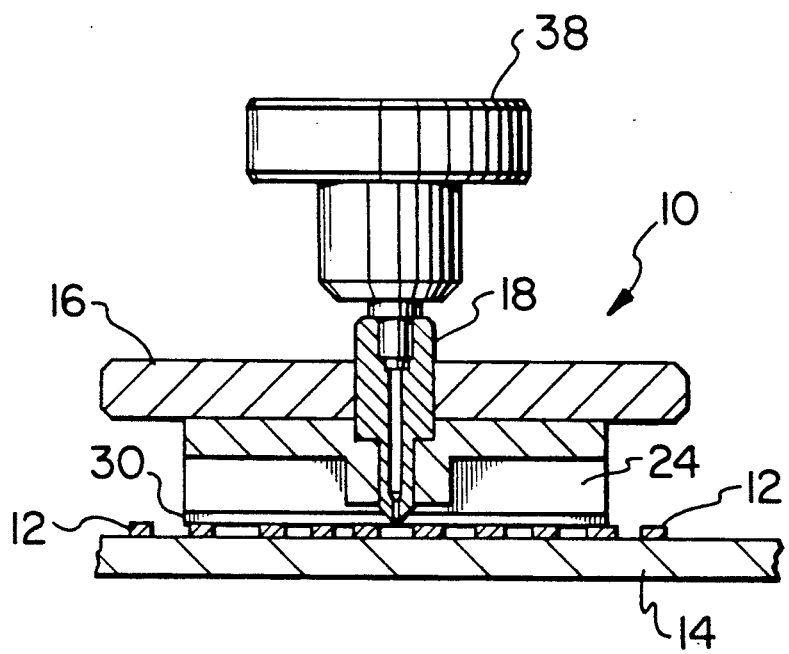
FIGS. 4 and 5 are cross-sectional views taken along line IV—IV in FIG. 3, and showing the device in two positions upon the printed circuit board.
Figure 5:
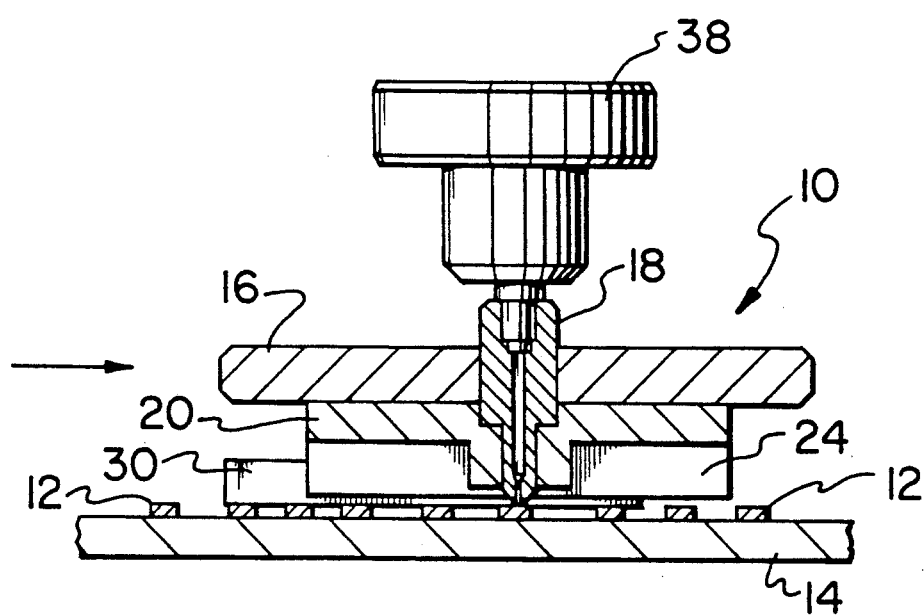

In use, with the nozzle connected to the air flow source through the hose as shown in FIGS. 2 and 3, air under pressure is applied through the hole and the device is supported upon the panel 14 for the purpose of measuring the height of the electrical pathways 12 above the upper o surface of the panel. As shown by a comparison of FIGS. 4 and 5, the body of the device is traversed over the panel 14 in a direction transversely to the longitudinal direction of the electrical pathways 12 while the slides 30 remain stationary, bridging across the pathways. As the body moves in this manner with hand pressure applied upon the body to maintain constant height for the device, air is directed from the outlet orifice in sequence against the upper surface of an electrical pathway then against the panel surface flanking the pathway and then against the upper surface of the next electrical pathway before being directed again against a flanking part of the surface of the panel 14 and so on. During this movement, the freedom for the pressurized air to exit from the orifice is affected by the distance of the opposing surface from the outlet orifice. Hence, as this distance changes the back pressure within the nozzle also changes. As a result, the back pressure in the air as it is applied against the surface of each conductor pathway is greater than when applied against the upper surface of the panel 14. These changes in back pressure correspond directly to the difference in distance between the surfaces of the electrical pathways and the outlet orifice and the distance between the panel surface and the outlet orifice. This change in back pressure is recorded upon the gauge 38 and, as indicated, is preferably provided by a distance readout. Hence, it is possible to record the distance from the outlet orifice to the outer surface of each electrical pathway and then the distance from the outlet orifice to the panel surface and a simple calculation will then provide with extreme accuracy the actual height of each pathway above the panel surface.

If for quality control purposes this test procedure is followed as required during production of the panels bearing the electrical pathways, a check on production accuracy may be maintained and any adjustments for electrical pathway height towards that required by the panel design, may be made upon subsequent panels.

The above device, as may be seen from the above description, allows for accurate measurements to be made thereby enabling an accurate determination of the height of each electrical pathway so that production control may be maintained at an extremely high standard.

What is claimed is:

1. A device for determining change in profile height of a surface of an article comprising a body, a body support means extending from one side of the body and which allows for movement of the body over the article while the support means remains stationary upon the article, and gas flow nozzle means within the body and providing a gas outlet orifice disposed to deliver a flow of gas outwardly from the one side of the body and beyond the support means to direct the gas at said surface, the support means including two slides slidably movable relative to the body and opposed one on each side of the outlet orifice, and the nozzle means provided for connection to a gas flow source and to means for sensing and indicating a change in a characteristic of the air flowing through the outlet orifice, the characteristic being dependent upon the distance of the outlet orifice from the surface.

2. A device according to claim 1 wherein each slide is slidably carried by a slide channel which is secured to the body.

3. A method of determining a change in profile height of a first surface formed by an elongate conductor element and a printed circuit board panel carrying the elongate conductor element comprising:

applying a vacuum to an opposite and second surface of the par ¹ of the printed circuit board to hold the panel against a planar support and thus maintain the panel in planar condition; and with the panel maintained in planar condition:

(a) moving a body carrying a gas flow nozzle across said first surface with a support means for the body remaining stationary upon said first surface and while detecting a flow of the gas from an outlet orifice of the nozzle in sequence at the conductor element and then at the panel so that any change in distance of the orifice from the first surface effectively causes a corresponding change in a characteristic of the gas flowing through the orifice; and (b) sensing and indicating said change.

4. A method according to claim 3 wherein the change is represented as a change in distance of the first surface from the nozzle orifice.

* * * * *